May 10, 1932.  C. O. BUENGER  1,858,185
LIQUID PUMP
Filed Jan. 10, 1930   2 Sheets-Sheet 1

Inventor:
Clarence O. Buenger
By A. Miller Belfield
Atty.

May 10, 1932.   C. O. BUENGER   1,858,185
LIQUID PUMP
Filed Jan. 10, 1930    2 Sheets-Sheet 2
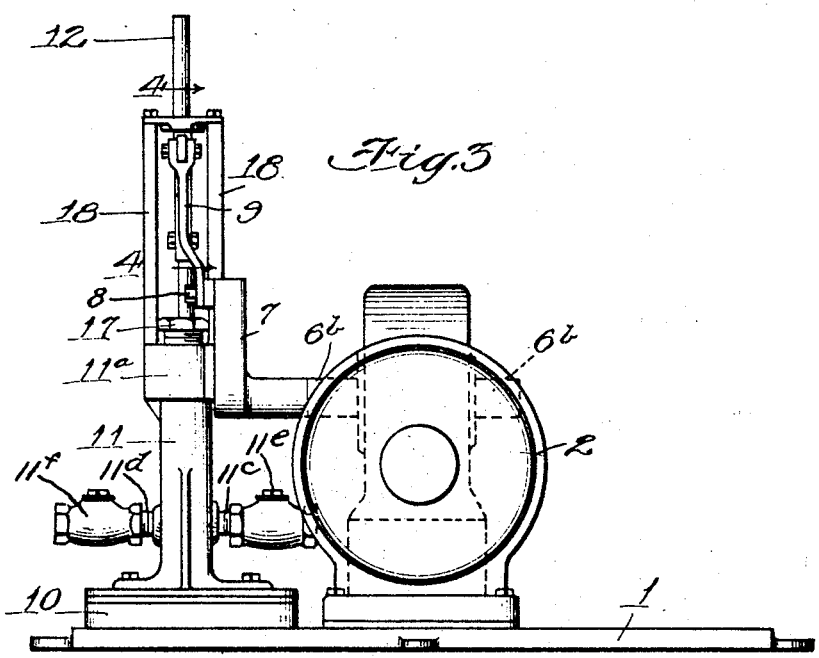
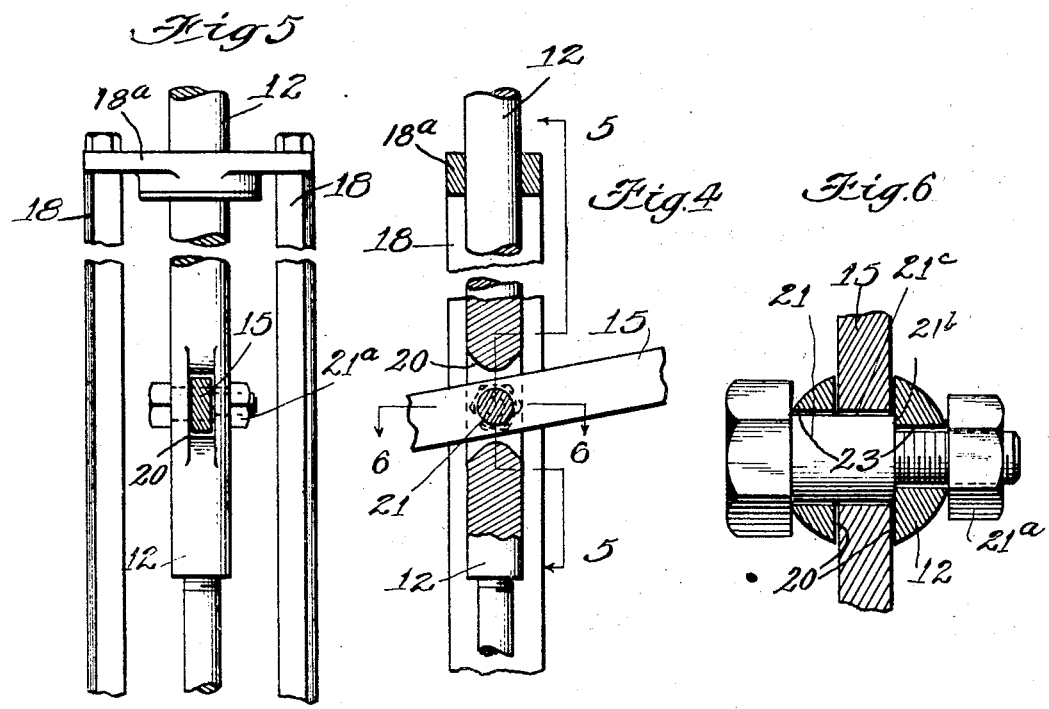
Inventor:
Clarence O. Buenger
By A. Miller Belfield
Atty.

Patented May 10, 1932

1,858,185

UNITED STATES PATENT OFFICE

CLARENCE O. BUENGER, OF CHICAGO, ILLINOIS, ASSIGNOR TO HILLS-McCANNA COMPANY, OF CHICAGO, ILLINOIS, A CORPORATION OF ILLINOIS

LIQUID PUMP

Application filed January 10, 1930. Serial No. 419,767.

My invention relates to liquid pumps, and particularly to variable capacity pumps.

One of the objects of my invention is to provide a positive action for supplying fluids under positive pressure.

Another object of my invention is to provide means for predetermining the volume of flow through the pump.

Another object of my invention is to provide means for guiding the piston rod or plunger to minimize wear on the packing gland.

These and other objects will be attained and will be pointed out in the claims.

In the drawings:—

Fig. 3 is an end view thereof;

Fig. 4 is a section at the line 4—4 of Fig. 3;

Fig. 5 is a section at the line 5—5 of Fig. 4; and

Fig. 6 is a section at the line 6—6 of Fig. 4.

Figure 1:
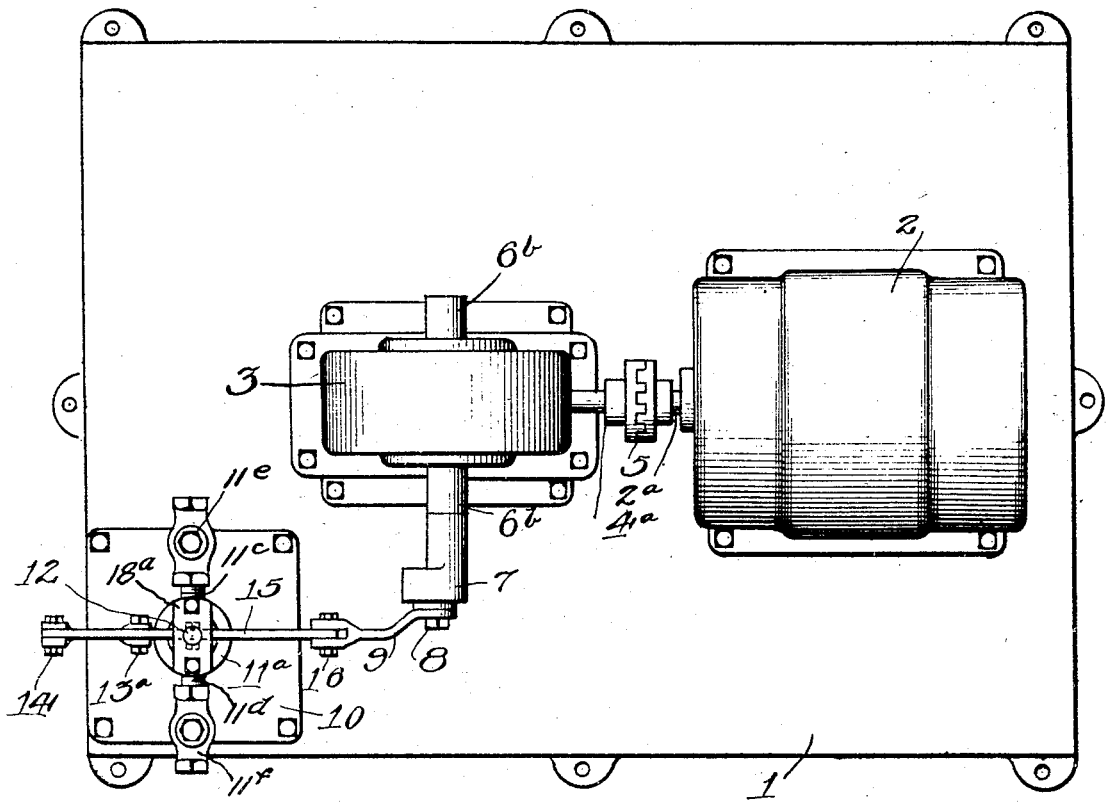
Fig. 1 is a plan of the assembly.

The pumping outfit is here shown as mounted on a base 1. An electric motor 2 furnishes the power through a speed-reducing device 3, which includes the worm 4 on the worm shaft 4a, which is operatively connected through a clutch 5 to the motor shaft 2a. The worm 4 meshes with a worm wheel 6 mounted on a shaft 6a suitably journaled at 6b—6b in the casing of the device 3. A crank arm 7 with a T slot 7a is mounted on the extended end of the shaft 6a.

The slot 7a is arranged to accommodate a wrist pin which may be adjustably secured in any required position to throw the connecting rod 9, thereby translating the rotary motion of the shaft 6a to reciprocating motion in the connecting rod 9 to any desired degree of travel and thereby varying the output of the pump mounted at 10.

The pump has the cylinder 11 and a usual piston within it which is operatively connected to the piston rod 12. A cylinder head 11a closes the upper end of this cylinder 11 and supports a pivotal connection at 13a for a link 13 which provides a fulcrum at 14 for a beam 15, the operating end of which is pivotally connected at 16 to the connecting rod 9.

Intake and exhaust pipe connections 11c—11d are arranged at the bottom of the cylinder 11 and have the check valves 11e—11f which determine the direction of flow to and from the pump.

The cylinder head 11a carries a packing for the rod 12 and a gland 17 of usual construction is associated therewith; to prevent undue wear to these parts, thereby inducing leakage, means is provided to guard against lateral movement of the piston. A guide block 18a is supported at the upper extremities of arms 18—18 which rise from the cylinder head 11a and acts to guide the upper end of the rod 12.

It will be noted that the placement of the wrist-pin 8 will control the capacity of the pump by causing the piston rod to travel more or less as this pin is moved in the slot 7a outward or inward with respect to the shaft 6a.

Figure 2:
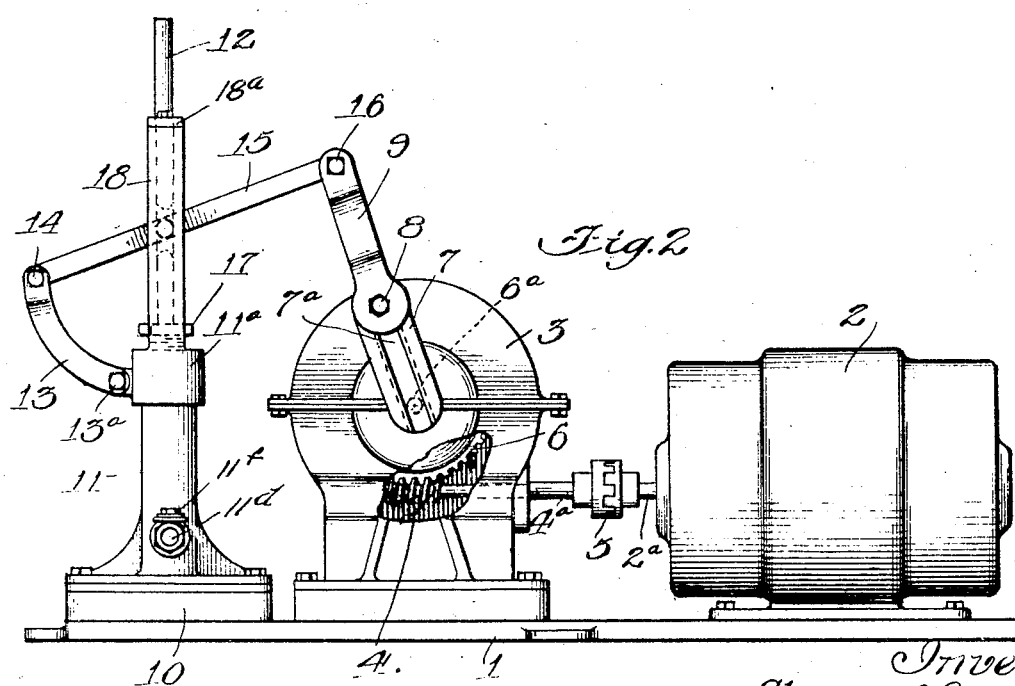
Fig. 2 is a side view of the same.

Due to the fact that the pump reciprocates at a fairly slow rate of speed, due to the large gear reduction between the motor and pump, the length of the stroke of the pump may be regulated while the pump is operating. This is done by unscrewing wrist-pin 8 and tapping lever or beam 15 downwardly when the parts are in the position shown in Fig. 2. In this manner the volume that the pump delivers in a given period of time may be accurately determined while the pump is actually operating, and an adjustment to either increase or diminish this volume is likewise possible while the pump is operating. This is a very important feature of applicant's construction.

The beam 15 passes through a slot 20 in the rod 12 and a shouldered bolt 21 takes through the two members when the nut 21a is screwed tight so that the shoulder 21b is brought securely against the inside of the slot 20 in the rod 12, thereby leaving the beam 15 free to pivot about the body 21c of the bolt 21.

It will be understood that modifications and changes may be made without departing from the spirit of my invention.

I claim:—

1. In a pumping mechanism, the combination of a reciprocating plunger pump, a motor for driving same, a speed-reducing gear interposed between the pump and the motor, a crank on the speed-reducing gear, a beam operated by the said crank, said beam pivotally connected to the pump plunger and fulcrumed beyond said plunger; and a link for fulcruming said beam, said link being pivotally mounted and arranged to compensate for the lateral movement of the fulcrum, with respect to the plunger during the operation thereof.

2. In a pump mechanism, the combination of a motor, a speed reducer associated therewith, a pump housing, a reciprocating plunger therein, a crank arm driven by said speed reducer, a beam operated by said crank arm, said beam pivotally connected to said plunger above said pump housing, and a link arm pivotally mounted on said pump housing, the outer end of said link forming a movable fulcrum for said beam beyond the pump plunger to form a straight line leverage.

3. In a pump mechanism, the combination of a motor, a speed reducer associated therewith, a pump housing, a reciprocating plunger therein, a crank arm driven by said speed reducer, a beam operated by said crank arm, said beam pivotally connected to said plunger, and a pivotally mounted link arm, the outer end of said link arm forming a movable fulcrum for said beam beyond the pump plunger to form a straight line leverage.

4. In a pumping mechanism, the combination of a reciprocating plunger pump, a motor for driving same, a speed reducing gear interposed between the pump and the motor, a crank on the speed reducing gear, a connecting rod having one end pivotally connected with said crank, a beam pivotally connected with the other end of said connecting rod, said beam being pivotally connected to the pump plunger and fulcrumed beyond said plunger, and a link for fulcruming said beam, said link being pivotally mounted and arranged to compensate for the lateral movement of the fulcrum, with respect to the plunger during the operation thereof.

5. In a pumping mechanism, the combination of a reciprocating plunger pump, a motor for driving same, a speed reducing gear interposed between the pump and the motor, a crank on the speed reducing gear, a connecting rod having one end pivotally connected with said crank, a beam pivotally connected with the other end of said connecting rod, said beam being pivotally connected to the pump plunger and fulcrumed beyond said plunger, and a link for fulcruming said beam, said link being pivotally mounted and arranged to compensate for the lateral movement of the fulcrum, with respect to the plunger during the operation thereof, and said connecting rod having a sliding connection with said crank to permit adjustment between the crank and connecting rod and thereby vary the throw of the pump plunger In witness whereof, I hereunto subscribe my name this 27th day of December A. D., 1929.

CLARENCE O. BUENGER.